(12) United States Patent
Tognon

(10) Patent No.: US 6,256,547 B1
(45) Date of Patent: Jul. 3, 2001

(54) PROCESS FOR THE AUTOMATIC GENERATION OF A SEQUENCE OF CONTROLS FOR A BENDING MACHINE FOR METAL SHEETS

(75) Inventor: Nicola Tognon, Vicenza (IT)

(73) Assignee: Salvagnini Italia S.p.A., Sarego (IT)

( * ) Notice: Subject to any disclaimer, the term of this patent is extended or adjusted under 35 U.S.C. 154(b) by 0 days.

(21) Appl. No.: 09/130,124

(22) Filed: Aug. 6, 1998

(30) Foreign Application Priority Data

Sep. 9, 1997 (IT) .............................. MI97A2046

(51) Int. Cl.[7] .................................. G06F 19/00
(52) U.S. Cl. .............................. 700/97; 700/165
(58) Field of Search ................... 700/165, 145, 700/118, 97, 95

(56) References Cited

U.S. PATENT DOCUMENTS

| | | | |
|---|---|---|---|
| 4,242,898 | 1/1981 | Salvagnini | 72/307 |
| 4,992,948 | 2/1991 | Pilland | 700/173 |
| 5,033,005 | 7/1991 | Haske | 700/187 |
| 5,587,914 | * 12/1996 | Conradson et al. | 700/95 |
| 5,822,207 | * 10/1998 | Hazama et al. | 700/97 |
| 5,969,973 | * 10/1999 | Bourne et al. | 700/165 |
| 5,971,589 | * 10/1999 | Hazama et al. | 700/145 |
| 5,980,085 | * 11/1999 | Uemura et al. | 700/97 |
| 5,988,855 | * 11/1999 | Marobin | 700/145 |
| 6,035,242 | * 3/2000 | Uemura et al. | 700/97 |

OTHER PUBLICATIONS

Japanese Patent Abstract; Publication No. JP 08281336.

* cited by examiner

Primary Examiner—William Grant
Assistant Examiner—Edward F. Gain, Jr.
(74) Attorney, Agent, or Firm—Akerman Senterfitt

(57) ABSTRACT

Process for the automatic generation of a sequence of controls for a bending machine for metal sheets, characterized in that: it provides for a first plurality of configuration files of a respective plurality of bending machines, each file containing information on the configuration of the respective bending machine; it provides for a second plurality of files each referring to a respective bending machine and constituting a library of controls for the bending machine; it provides for a first database of geometrical shapes of mechanical organs, containing a geometrical representation of mechanical organs of the bending machines; it provides for a second database containing information on the behavior of a plurality of materials when these are submitted to bending.

14 Claims, 9 Drawing Sheets

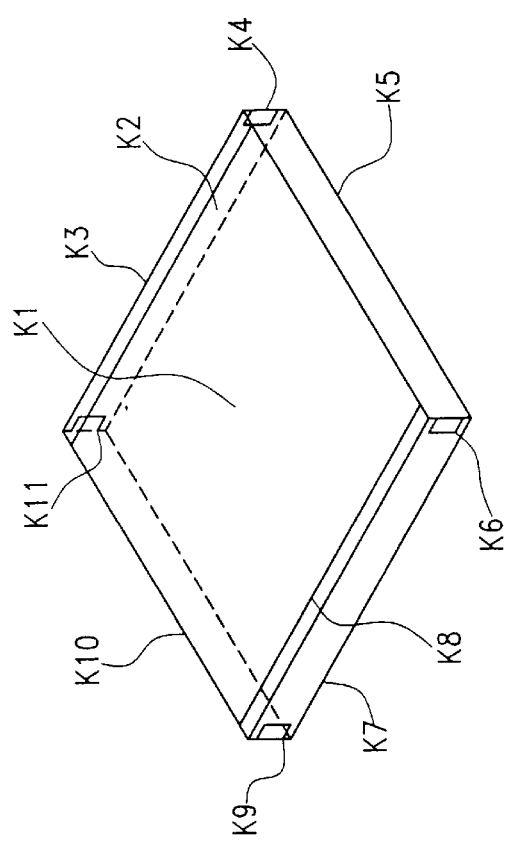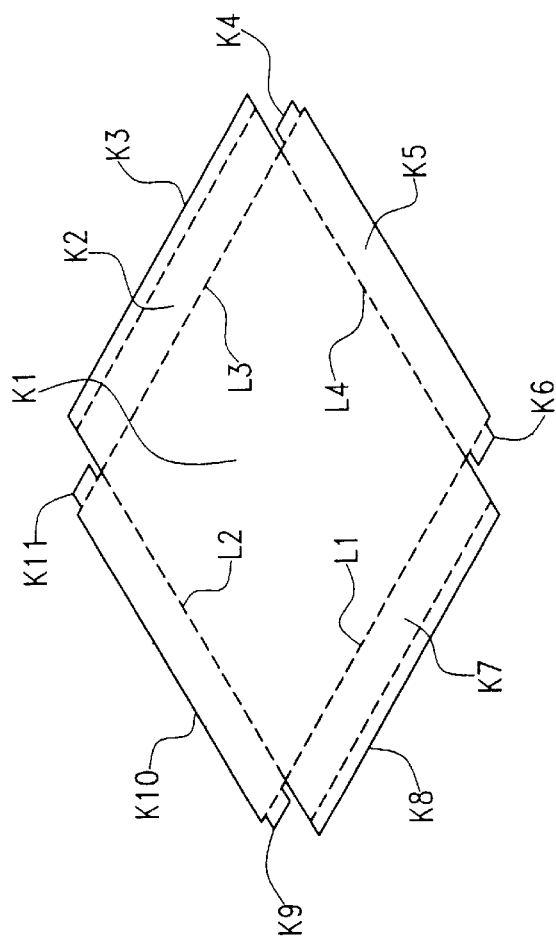

PROCESS FOR THE AUTOMATIC GENERATION OF A SEQUENCE OF CONTROLS FOR A BENDING MACHINE FOR METAL SHEETS

DESCRIPTION

The present invention refers to a process for the automatic generation of a sequence of controls (control program) for a bending machine for metal sheets, in particular for a numeric control bending machine, even more in particular a flexible bending machine capable to accomplish the bending of more sides of a metal sheet to obtain a metal sheet panel, in which the profile of a bent side is independent from the profile of the other sides, without any manual intervention of an operator.

A similar bending machine is described for example in the U.S. Pat. No. 4,242,898.

Metal sheet panels of this type have a wide utilisation for example in the manufacture of metal cabinets, refrigerators, washing machines, air conditioners, shelving in general etceteras.

The known numeric control bending machines comprise a control system. Based on the design of the panel to be realised, the operator sets a sequence of controls that the control system translates into a sequence of operations that the bending machine will execute in order to get, from the metal sheet, to the panel.

Each bending machine is generally provided with its own control system, and it is programmed by means of a particular programming language.

Programming of the bending machine is therefore a complex process, that can be accomplished only by an expert operator capable to determine in advance the operations that the bending machine must perform in order to obtain the desirable result, for each bend present in the design of the panel.

In view of the state of the art described, object of the present invention is to provide for a process for the automatic generation of a sequence of controls for a bending machine that would make the programming of the bending machine quicker, without errors and accessible even for people who have not any specific knowledge of the programming language of the bending machine.

According to the present invention, such object is attained by means of a process for the automatic generation of a sequence of controls for a metal sheets bending machine, characterised by:

providing for a first plurality of configuration files of a plurality of bending machines, each file referring to a respective bending machine of said plurality and containing information on the configuration of the respective bending machine;

providing for a second plurality of files each referring to a respective bending machine and constituting a library of controls for the bending machine;

providing for a first database of geometrical shapes of mechanical organs, containing a geometrical representation of mechanical organs of the bending machines;

providing for a second database containing information of the behaviour of a plurality of materials when these are submitted to bending, and in that the process comprises the following stages:

a stage of geometrical design of a panel in a tridimensional CAD design environment in which a geometrical design of a panel is defined;

a configuration stage for the selection of a particular bending machine within said plurality of bending machines, in such a way as to select a first file among said first plurality of files, and a second file among said second plurality of files;

a stage of acquisition of the geometrical design of the panel for the individuation of the bends provided in said geometrical design of the panel;

a stage of preliminary verification of the geometrical design of the panel for the verification of the possibility of the panel manufacture by means of the selected bending machine;

a processing stage in which, by associating the first file with the first database, a virtual tridimensional representation of the selected bending machine is obtained and said virtual representation of the bending machine is associated with said second file and with said second database, in order to obtain a tridimensional simulation of the bending process of a metal sheet, said simulation determining the sequence of bending operations that the bending machine must execute in order to obtain the designed panel;

a stage of generation of the sequence of controls for the bending machine starting from the sequence of the bending operations, said sequence of controls allowing the bending machine to execute said sequence of bending operations.

The process according to the present invention shows the following main advantages:

flexibility: it allows to generate automatically a sequence of controls for a bending machine, starting from the geometrical design of a panel obtained in CAD (Computer Aid Design) design environment, whichever the panel to be produced;

independence of the geometrical design of the panel, made in the CAD environment, from the specific bending machine that is meant to be used: the panel is geometrically designed without having to take into account the characteristics of the bending machine that is meant to be used; the process generates automatically, starting from the geometrical design of the panel, the correct sequence of controls for the particular bending machine that is selected during the configuration stage;

it does not require a specific knowledge of the programming language of the bending machine that is meant to be used: the user, that is the designer of the panel, must not determine the sequence of operations that the bending machine has to perform in order to obtain the desired panel, and therefore translate such sequence of operations into a sequence of controls for the bending machine; it is sufficient to specify the tridimensional geometry of the panel;

it provides a support to the user in the design activity: during the preliminary verification stage, the process automatically detects possible errors in the panel design, for example shorn comers, and consents their correction; in addition, the process verifies the possibility of manufacturing of the designed panel by means of the selected bending machine.

Preferably, the process provides for a stage of generation of a geometrical representation of the plan development of the panel, after the processing stage. Said geometrical representation of the plan development of the panel can be used to generate automatically a sequence of controls for a metal sheets punching machine that would predispose the metal sheet (with the required shorn corners) to be fed to the bending machine.

In this way, the user (designer of the panel) must not have a specific knowledge of the precise definition of the geometry of the punched metal sheet to be fed to the bending machine in order to obtain the panel.

These and other characteristics and advantages of the present invention will be rendered more evident by the following detailed description of an embodiment thereof, illustrated as a non-limiting example in the enclosed drag in which:

FIG. 8 shows an axonometry an example of panel geometrical design;

FIG. 9 is a plan development of the panel of FIG. 8;

Figure 1:
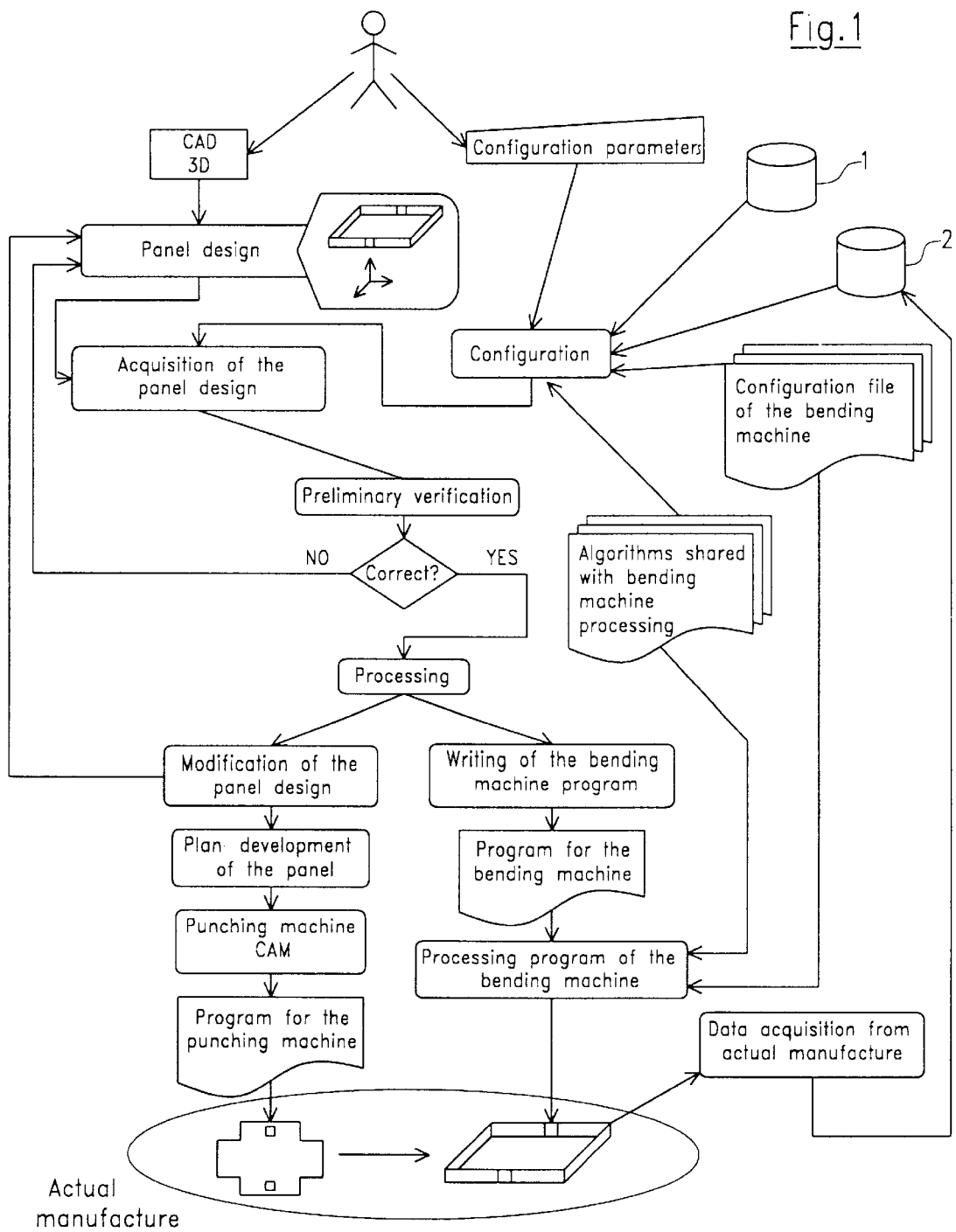
FIG. 1 is a schematic representation by means of flow chart of the process according to the present invention.

With reference to the drawings, in FIG. 1 a schematic representation in the form of a flow chart of a preferred embodiment of the process of automatic generation of a sequence of controls for a bending machine according to the present invention is shown. Such process is destined to be executed in an automatic way by means of an electronic processor provided with a processing unit, with memorisation devices, with a visualisation device (display), and with a data input device for a user (keyboard, mouse).

The process according to the present invention is composed essentially of the following stages:

configuration;

acquisition of the design of the panel to be realised;

preliminary verification;

processing;

modification of the panel design;

writing of the program for the bending machine.

The above mentioned stages will be now explained in details.

During the configuration stage the processing environment for the subsequent stages of the process is predisposed.

First of all, it must be pointed out that the process according to the invention has the following peculiar characteristic: starting from the design of a panel created in a tridimensional (3D) CAD (Computer Aid Environment) design environment, in which the characteristics of the bending machine that will be used for the production of the panel are not taken into account, it is able to generate a sequence of controls (program) for a specific bending machine, said sequence of controls allowing the specific bending machine being used to manufacture a panel in the way it has been designed by means of the CAD program.

In the context of the present description, for CAD program it must be intended, a program that provides for the instruments to define geometrical shapes in tridimensional space, and for the instruments to handle typical concepts of a metal sheet panel such as the sheet thicknesses, type of material, plan development of the panel.

During the configuration stage the process according to the invention involves therefore an interaction with the user, who must operate a choice on the particular bending machine that will be used for the manufacture of the panel.

To this purpose, for each bending machine available, in the memory of the processor that executes the present process, there are a configuration file of the bending machine shared with the processing program of the bending machine, and a library of algorithms (routines) also shared with the processing program of the bending machine. For "processing program of the bending machine" it is meant the program that allows the translation of a sequence of instructions (control program) for the bending machine into the programming language typical of the bending machine in the form of an "object" code that can be executed by the bending machine control system.

Figure 2:
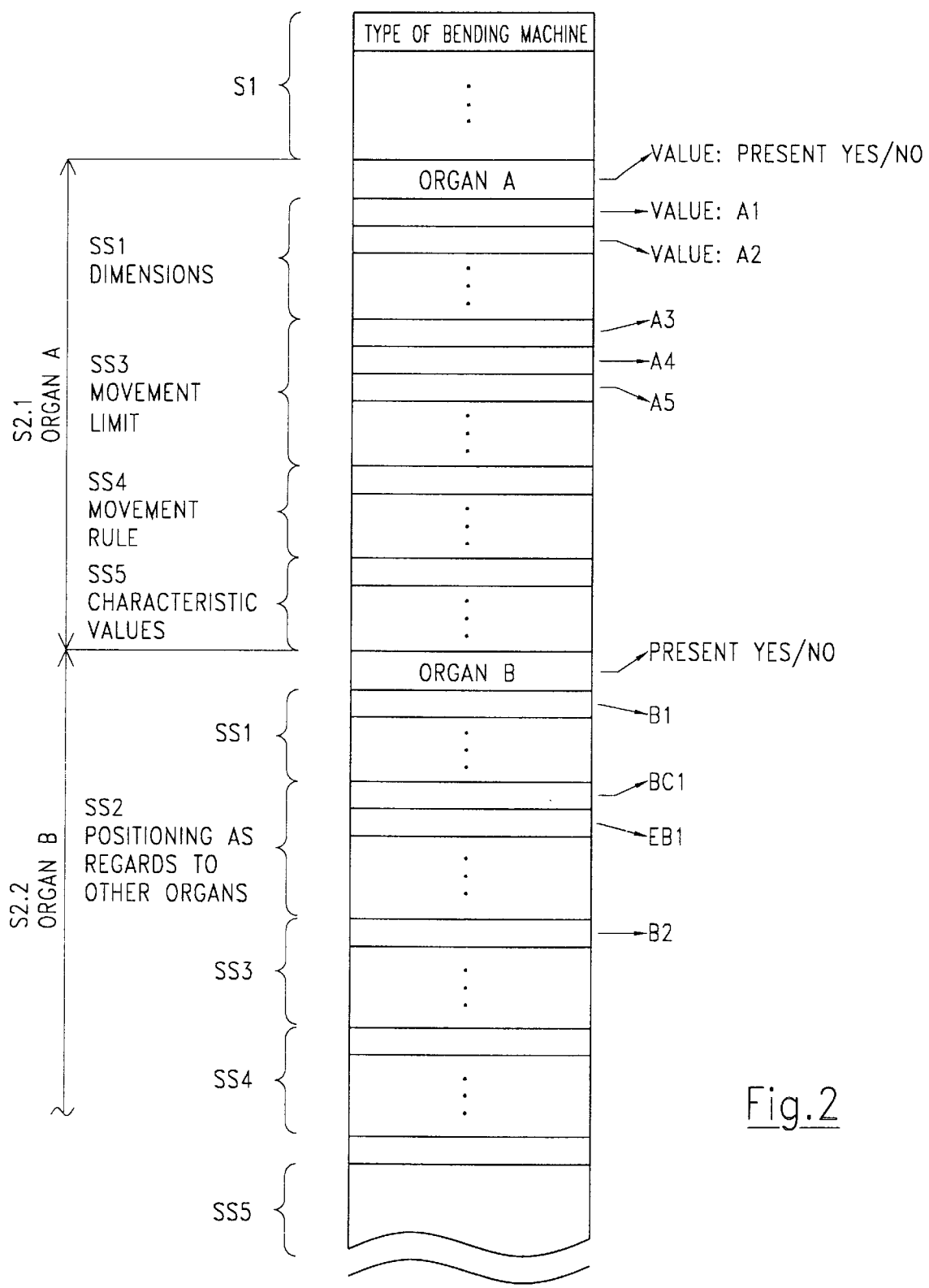
FIG. 2 is a schematic representation of a configuration file of a bending machine utilised by the process according to the invention.

The configuration file of the bending machine, shown schematically in FIG. 2, contains data on the configuration of the bending machine in terms of mechanical organs composing it. Such configuration data of the bending machine provides a complete description of the characteristics of the mechanical organs of the bending machine, in terms of typology and dimensions of the tools available for such bending machine (bending machines belonging to a same model can, and as a matter of a fact generally they are configured by the producer on the bases of the needs of the single customer, equipping them with particular tools suitable for the particular manufacturing that the customer must produce).

The process according to the invention, as also the bending machine processing program, refers to a "virtual" bending machine that is described parametrically. The virtual machine is instanced, in such a way as to coincide with the actual bending machine, by using the information contained in the bending machine configuration file.

The configuration file of the bending machine is structured so as to be subdivided into sections. A first section S1 contains information on the general characteristics of the bending machine (for example, the type of bending machine).

Besides the first section S1, the configuration file comprises a plurality of sections S2.1, S2.2 each relating to an organ of the bending machine.

Figure 3:
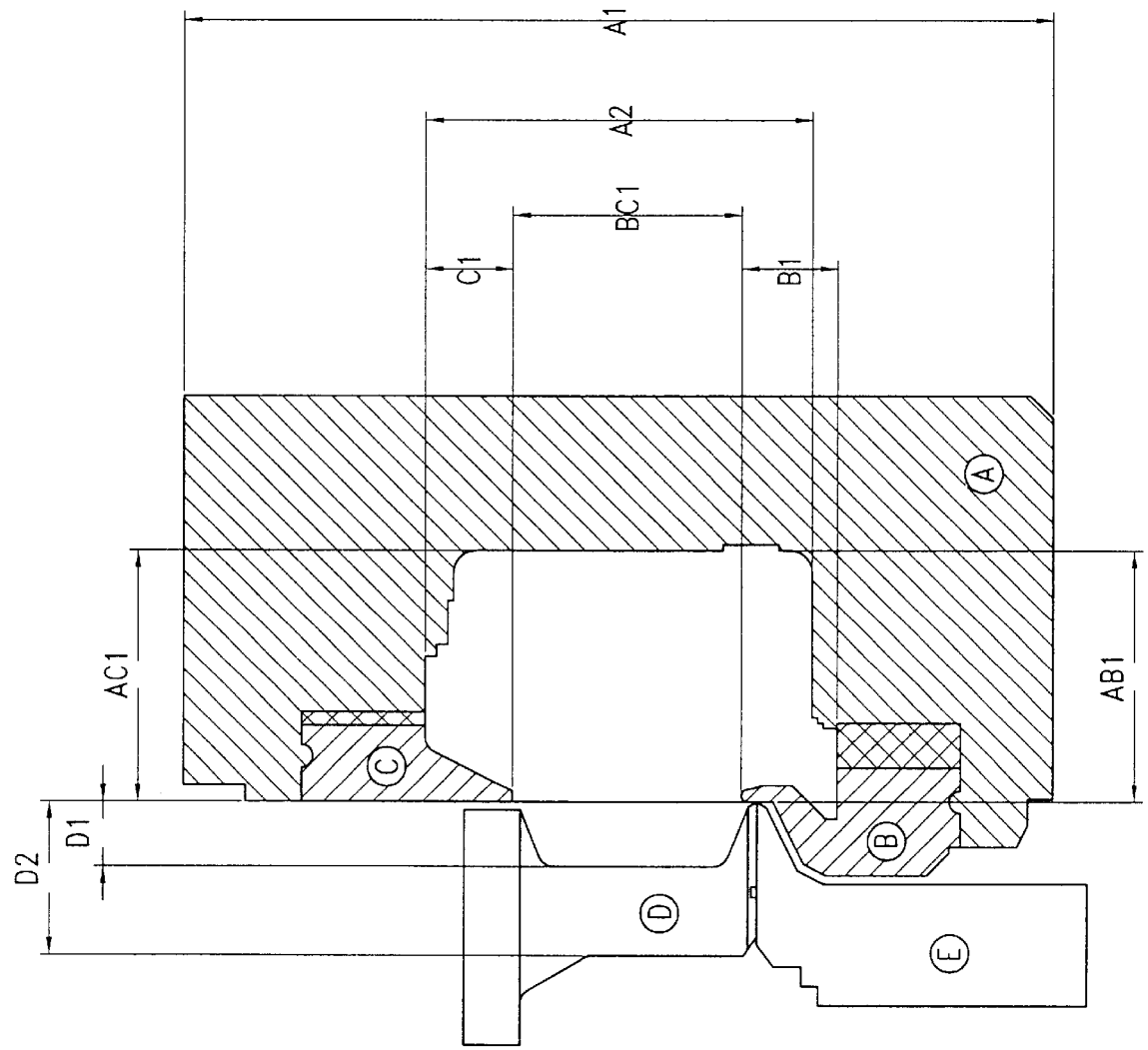
FIGS. 3 and 4 show the mechanical organs of a particular bending machine, with the dimensions that are memorised in the file of FIG. 2 indicated on them.
Figure 4:
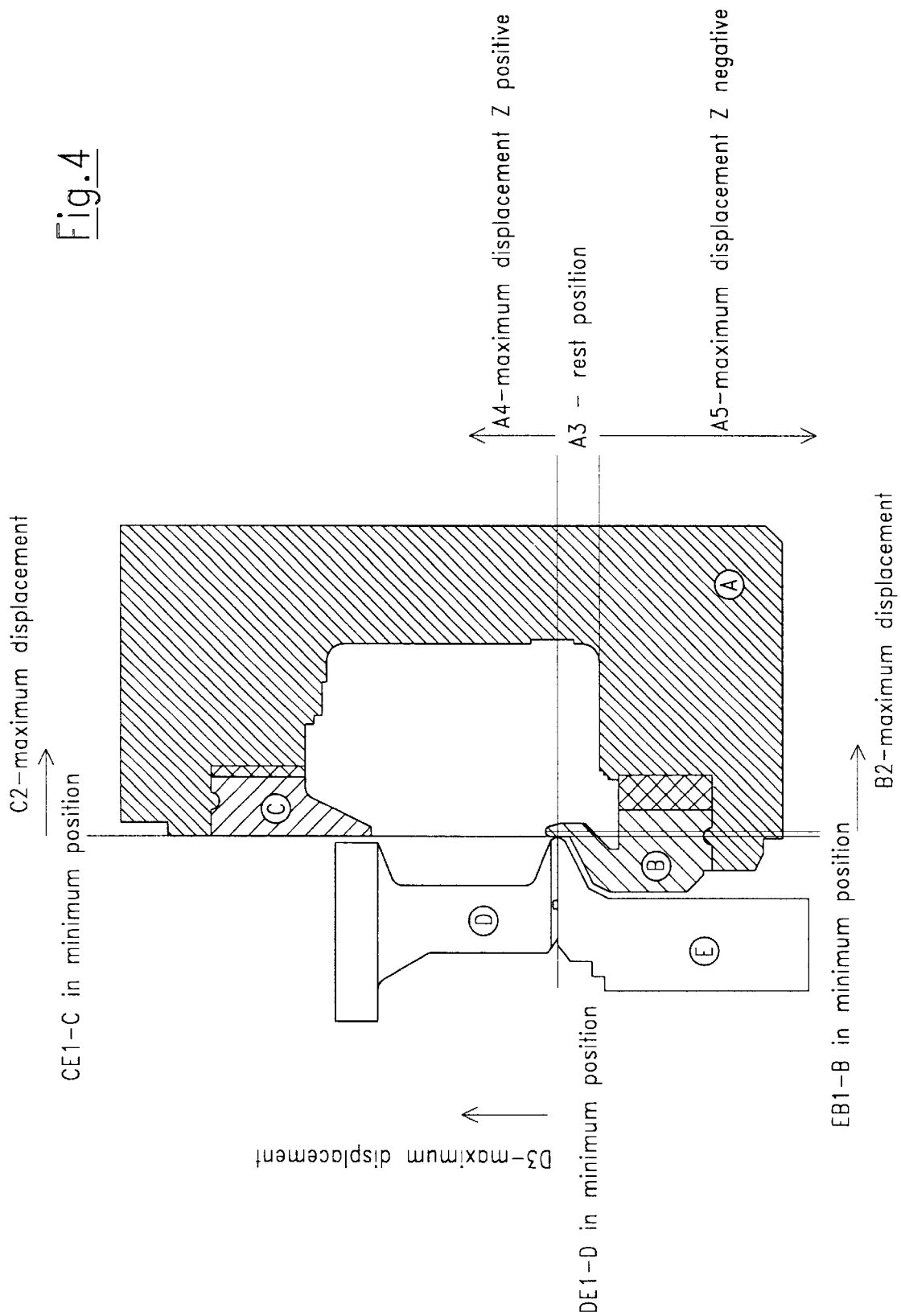

Each section S2.1, S2.2, comprises a field (ORGAN A, ORGAN B, ... ) which contains a key for the identification of the organ and the information regarding the actual presence or not of the organ in the bending machine (PRESENT YES/NO). In such field an index for a table of explicatory massages can be memorised; the process according to the invention uses said index to trace in said table and to show the user, together with the content of the numeric value field, also an explanation in the selected language. Each section S2.1, S2.2., ... is subdivided into subsections SS1–SS5. The subsection SS1 contains the significant dimensions of the organ; for example, with reference to FIG. 3 and 4 in which some organs of a typical bending machine are shown, A1, A2 identify the significant dimensions of organ A, consisting of a bending blade holder unit, B1 identifies the significant dimension of organ B, consisting of a lower bending blade, C1 identifies the significant dimension of organ C, consisting of a upper bending blade, and D1, D2 identify the significant dimensions of organ D, consisting of the upper counter blade or blank holder. The subsection SS2 contains information on the position of the organ as regards the other organs of the bending machine, in a rest position; for example, still with reference to FIG. 3 and 4, AB1 identifies the position of organ B (lower bending blade) as regards organ A (blade holder unit), BC1 identifies the position of organ B as regards organ C (upper bending blade), EB1 identifies the position of organ B as regards organ E (lower blank holder); Section S2.1, referring to the blade holder unit, does not contain the subsection SS2, since the positions of the remaining organs of the bending machine as regards the blade holder unit are specified in the configuration file sections concerning said other organs. The subsection SS3 contains information on the limits of the possible interval of the movement of the organ; for example, still with reference to FIG. 4, A3 identifies the rest position of organ A (blade holder unit), A4 identifies the maximum displacement of organ A along the vertical direction (axes Z) upward (positive sense), A5 identifies the maximum displacement of organ A along axes Z in the negative sense), B2 identifies the maximum displacement of organ B (lower bending blade) in horizontal direction, C2 identifies the maximum displacement of organ C (upper bending blade) in horizontal direction, D3 identifies the maximum displacement of organ D (upper blank holder) along axes Z. Subsection SS4 contains the rules of the organ movement, in terms of coefficients of the equations that regulate the organ movement. Finally, subsection SS5 contains characteristic values of the organ movement, for example the pressure that must be applied to an actuator in order to move the organ.

The library of algorithms shared with the processing program of the bending machine comprises routines (program modules) written in the programming language typical of the selected bending machine. Such routines are used by the process according to the invention in the processing stage that will be described later in order to determine the movement of the bending machine mechanical organs, thus foreseeing the way in which the bending machine will execute the controls (instructions) of the sequence that will be automatically generated during the stage of the writing of the program for the bending machine.

In addition, still in the memory of the processor, a centralised file or database of geometrical shapes (indicated by 1 in FIG. 1) and a database of materials, thicknesses and typology of the bends (indicated by 2 in FIG. 1) are memorised.

Figure 5:
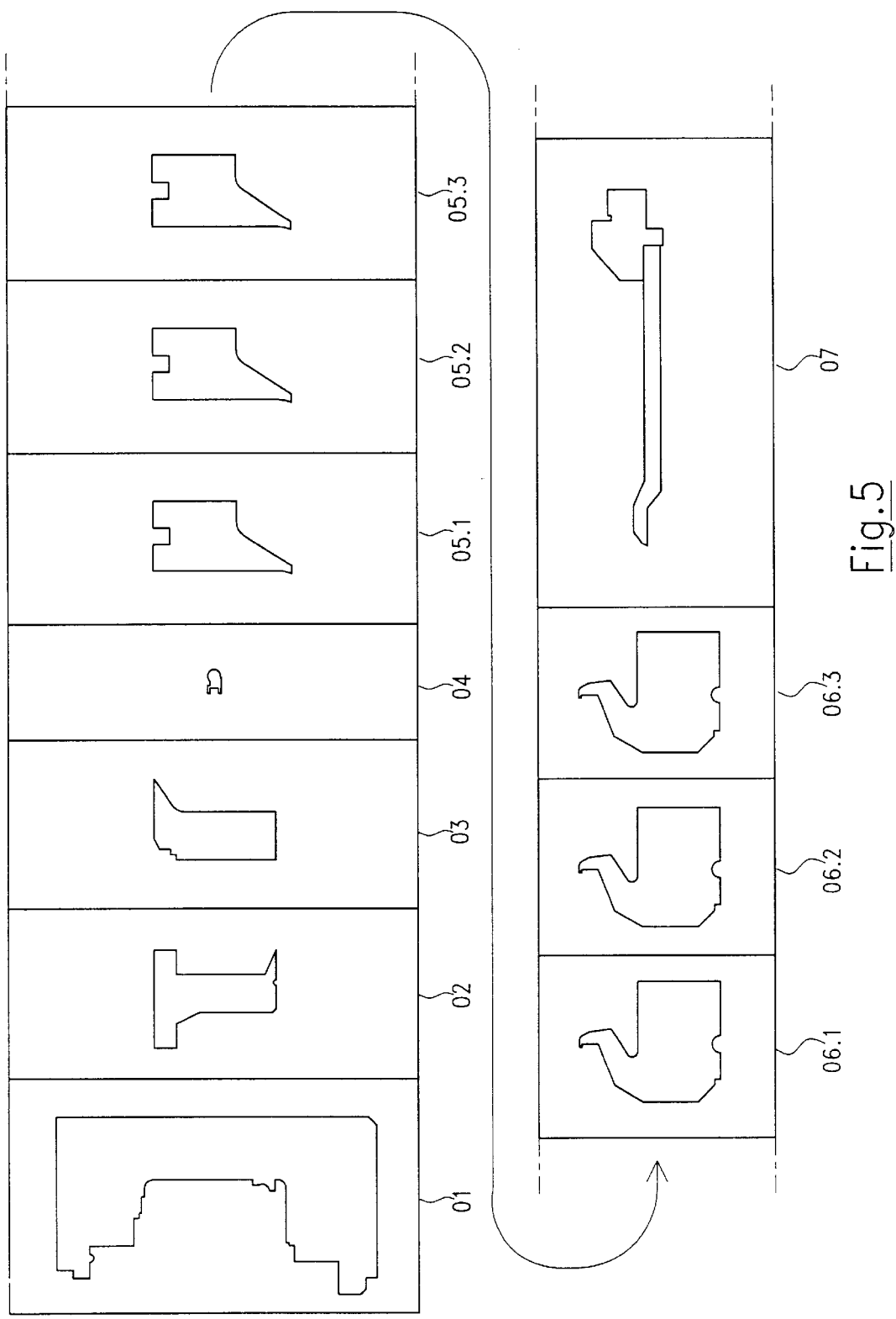
FIG. 5 is a schematic representation of a database containing representations of the geometrical shape of the mechanical organs of the bending machines utilised by the process according to the invention.

The geometrical shapes database 1 contains data suitable to describe the geometrical shapes of all the mechanical organs that can be present on the various available bending machines. Such database can be generated by using the same tridimensional CAD designing environment used time after time to define the design of the panel that it is wanted to be realised. An example of the content of such database is schematically shown in FIG. 5: the geometrical shapes database 1 contains a representation, obtained by means of the CAD program, of the geometrical shape of the blade holder blocks of the bending machines (O1), of the upper and lower blank holders (O2, O3), of the upper (O5.1, O5.2, O5.3) and lower (O6.1, O6.2, O6.3) bending blades, of possible optional tools (O7) and of the other mechanical organs composing the bending machines, as for example accessories for the assembly of the optional tools (O4).

The process according to the invention provides the possibility for the user to create the representations of the geometrical shape of possible optional tools directly designed by the user, in the same tridimensional CAD designing environment used to create the panel design, and the input of such geometrical shapes in the database 1. For such tools the user, besides having to provide for a geometrical representation, will have to give information on the forms of their employment, information that will be memorised in the configuration file of the bending machine that uses such tools and that will be used in the subsequent processing stage in order to simulate the operation of said tools and the consequent bendings on the metal sheet.

Figure 6:
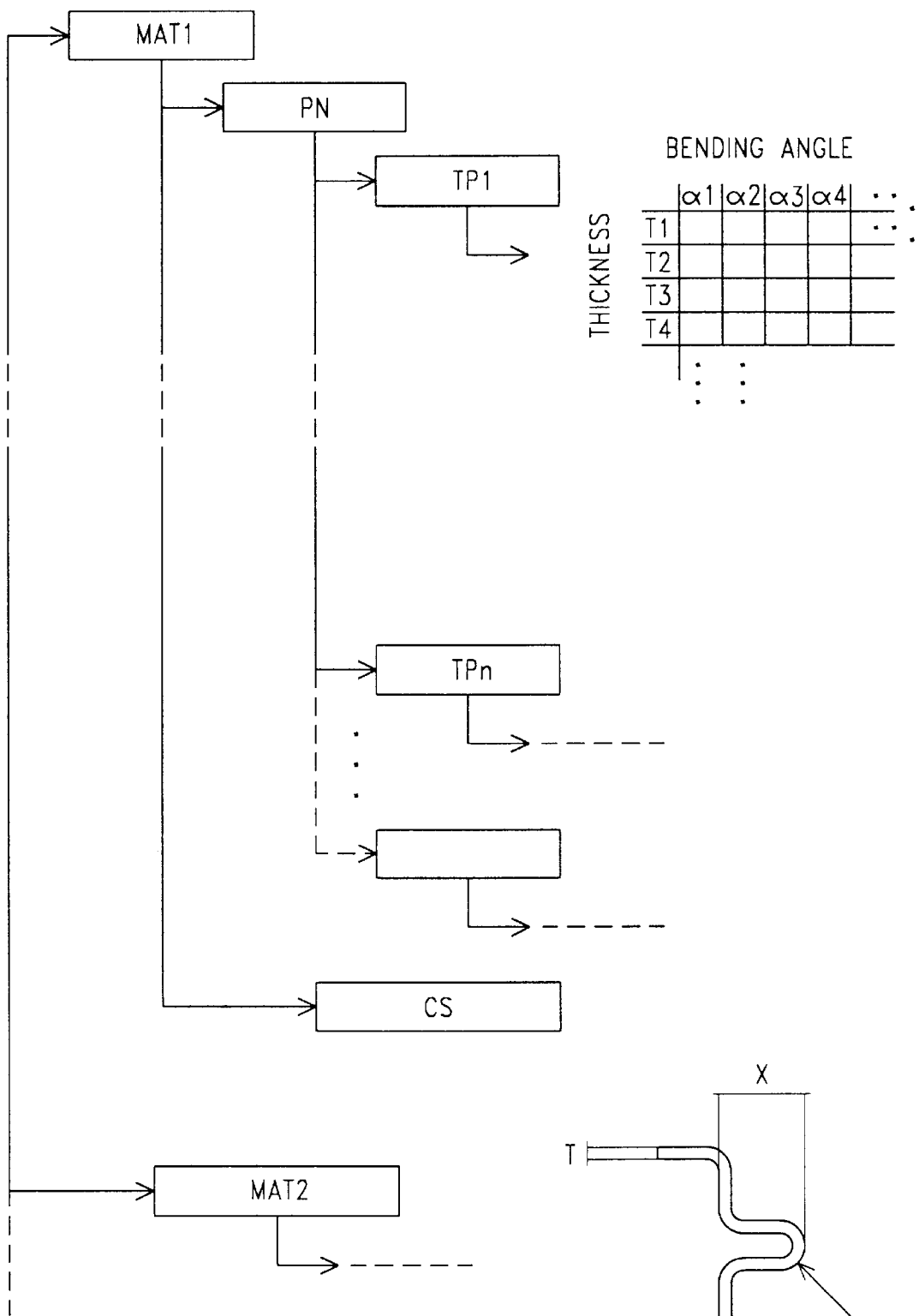
FIG. 6 is a schematic representation of the database of materials, thicknesses, typology of the bends utilised by the process according to the invention.

The database of materials, thickness and typology of the bends 2, represented schematically in FIG. 6, contains data on the possible materials and thicknesses of the metal sheets that will be used to obtain the panel (for example, information on the deformations that the sheet undergoes during the bending process), and on the typology of the bends (positioning of the organs of the bending machine in order to execute the bending). Such database is built up with data obtained experimentally starting from a specimen material, and it contains: a) information about the behaviour of metal sheets of different materials and thickness during the bending executed with the selected bending machine; b) a file of the various typologies of bending, identified by a respective conventional name and each characterised by a particular combined use of the mechanical organs of the bending machine.

With reference to FIG. 6, the database of materials, thicknesses and typology of the bends 2 is subdivided into several sections, each referring to a particular type of material (MAT1, MAT2, . . . ). Each section is in turn subdivided into two subsections PN (nominal or elementary bends) and CS (special cycles). The subsection PN contains in turn several subsections TP1, . . . , TPn (type of bend) each referring to a particular type of bending that is obtainable with a normal bending cycle of the bending machine. Each subsection TP1, . . . , TPn contains information about the behaviour of the material which section MAT1 refers to, during that particular bending, as a function of the bending angle ($\alpha 1$, $\alpha 2$, $\alpha 3$, $\alpha 4$, . . . ) and of the thickness (T1, T2, T3, T4, . . . ) of the material (metal sheet). Such information is structured in the form of a table in which, for each pair (bending angle, material thickness) information on the radius of the obtained bend, on the stretching of the material during the bending process, on the correct positioning of the organs of the bending machine are memorised.

Figure 7:
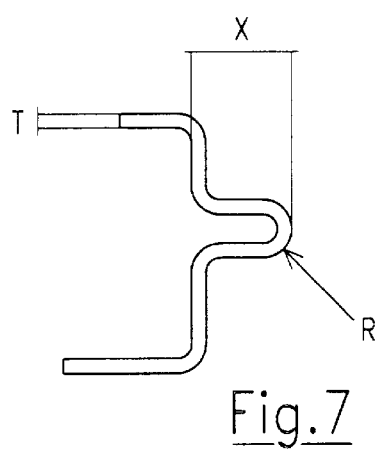
FIG. 7 shows an example of a profile of "special" bending.

Subsection CS (special cycles) contains a parametric description of the bending profile in case this cannot be obtained as an elementary bending among the ones memorised in subsection PN (TP1, . . . , TPn), but instead as a set of elementary bendings, in addition to other possible bending operations not comprised in the ones that lead to the obtainment of the elementary bendings. A bending profile of this kind is identified as "special profile". In the database 2 a special profile is completely defined by a set of geometrical information on the result that is wanted to be obtained and by a set of information relative to the sequence of bending operations that the bending machine must execute/perform in order to obtain the panel. For example, with reference to the example shown in FIG. 7, the "special" profile therein shown is described parametrically by memorising the interval of thicknesses (T>1.5 mm) of the material for which the special profile is defined, the interval of values for the dimension X (10 mm<X<16 mm), the interval of values for the bending radius R (R<5.5 mm). In addition, for such special profile the sequence of the elementary bendings composing it, and the stretching of the material during the bending process is memorised. In general, for each one of the elementary bends composing the special profile it is possible to define the possible interval of variation of the angle and of the mutual distance within which the special profile is defined. The information relative to the sequence of bending operations to be executed are defined both in the form of elementary forms (repeatable in the same database 2) and in the form of particular sequences of movement of the mechanical organs of the bending machine. In the presence of parametrically defined special profiles, that means with possible variations of some of their geometrical characteristics, the sequence of bending operations handles parameters that vary as a function of the geometrical parameters.

Figure 12:
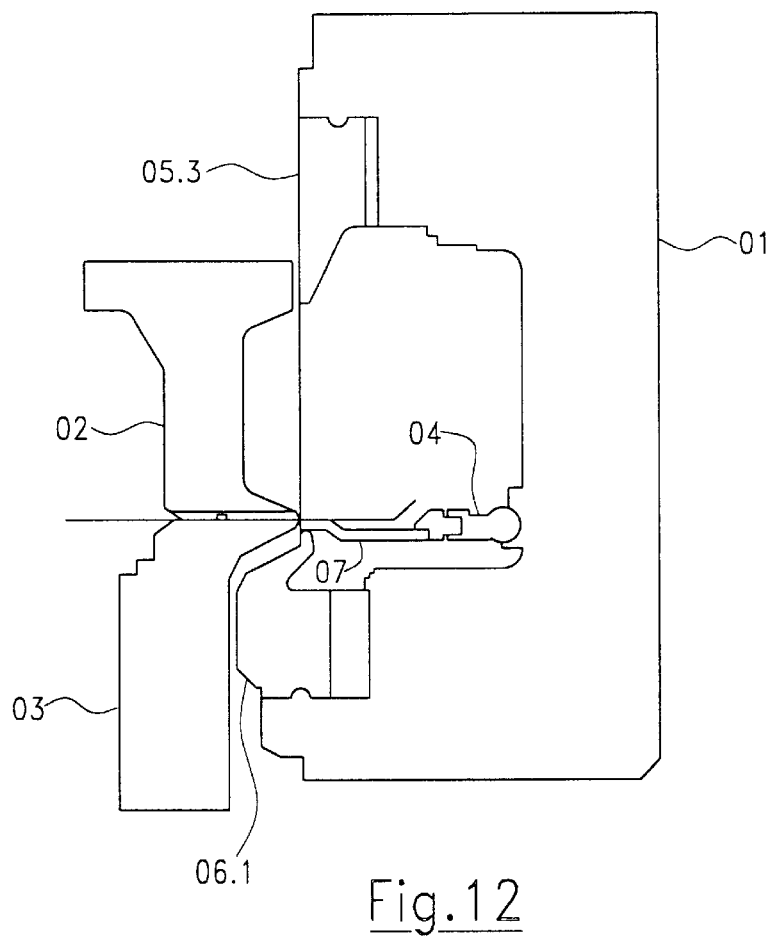
FIG. 12 is a virtual representation of a selected bending machine operated through the process according to the invention starting from the database of FIG. 5.

Once the user has made his choice on the bending machine that he intends to use for the manufacture of the panel, in the configuration stage, all the data describing the bending machine in terms of typology of tools available on that bending machine, are automatically drawn from the respective configuration file of the bending machine; such data are then utilised to trace the data describing the geometrical shape of the organs of the selected bending machine in the database of the geometrical shapes 1. These latter data are then utilised in order to obtain an exact virtual representation, in scale 1:1, of the selected bending machine (FIG. 12), that is obtained by assembling the geometrical shapes of the mechanical organs forming the selected bending machine according to what specified in the configuration file of the bending machine, virtual representation that will be taken advantage of in the subsequent stages of the process. As already mentioned, the geometrical shapes database 1 contains the representation of the geometrical shape of the mechanical organs of the bending machine; in order to obtain the virtual representation of the bending machine, tridimensional developments of the mechanical organs are obtained, starting from the geometrical representation of the sections, owing to the values specified in the numeric value field of the records relative to such organs in the configuration file of the bending machine.

Still in the configuration stage, the user provides additional configuration parameters, as for example the enabling to the use of so-called "special cycles" of bending that allow to obtain particular bends as a combination of operations of elementary bending, etc. Through these parameters the user directs the process according to the invention during the subsequent processing stage, in order to generate automatically control sequences for the bending machine as adherent as possible to the needs of the user. In fact, some bends present in the design of the panel can be not such as to respect the geometrical characteristics set in the database of materials, thicknesses, typology on bends 2; in such case during the processing stage the process must make a choice between sequences of operations that allow to obtain a panel as adherent as possible to the design, although costly in terms of time and cause of wear to the organs of the bending machine and sequences of operations that allow to obtain a panel close enough to the design, in less time and with minor wear of the organs of the bending machine. Through parameters set during the configuration stage the user can direct the process, in the subsequent processing stage, in order to specify the choices to operate. For example, in the database of materials, thicknesses, typology of bends 2 for each bending angle a minimum obtainable radius is specified below which the bending machine is not able to operate, and a maximum radius that is determined in such a way as to minimise the length of the bending process. Radiuses above the preestablished maximum are obtainable, to the prejudice of the velocity of execution, by subdividing the bend into several elementary bends whose global result would approach, in terms of angle and radius, what specified in the design of the panel. Such process is the more precise, and the slower, the more numerous elementary bendings must be accomplished; one of the configuration parameters allows the user to specify by how much the process can autonomously modify the radius of a bending in order to execute it by an optimal sequence of operations. The configuration parameters are memorised in tables that can be called and modified by the user.

During the stage of acquisition of the design of the panel, the data relative to the design of the panel to be realised, design that as previously mentioned is obtained in a tridimensional CAD designing environment, are acquired. The process according to the invention therefore involves an interaction with the CAD program.

Starting from the specifications on the panel to be realised, the panel is designed in the CAD design environment. In this stage, the user designs on the display, with the aid of the data input devices, the panel that it is wanted to be obtained, thus defining its geometrical characteristics, that is its dimensions, the shape of its bends, the possible machinings (piercing, bossing, etc.), and in addition defines some technological characteristics of the panel, such as the type and the thickness of the metal sheet to be used.

During the stage of acquisition of the panel design the data regarding the dimensions of the panel to be realised, the geometrical characteristics of each bend present in the panel as per what designed by means of the tridimensional CAD program (bending radius, bending angle, type of bend to be executed, height of the bend), the type and the thickness of the metal sheet to be used, are automatically acquired from the CAD design environment.

Still in the stage of acquisition of the panel design, after having acquired the aforementioned data, an analysis of the panel design is carried out in order to determine:

the part of the panel that, during the bending operations, does not undergo any roto-translation in space (so called "base of the panel"); once the base of the panel has been determined, this is analysed to individuate its sides, that is the common segments between the base itself and the bends adjacent to it;

the topological relationships between the various bends, in order to obtain a graph of the parental relationships between the same bends. On the bases of the topological relationships between the various bends that are individuated and of the conformation of the base of the panel, the bends are grouped into sets of bends parallel to one of the significant sides of the base. Each one of these sets makes a bending profile of the panel;

the correct development of the panel, by associating the results obtained from the database of materials, thicknesses, typology of the bends to each bend. In this way, the process according to the invention allows to automatically correct the design of the panel, that as it has initially been said is independent from the bending machine that it is wanted to be used, according to the bending machine chosen during the configuration stage.

Figure 10:
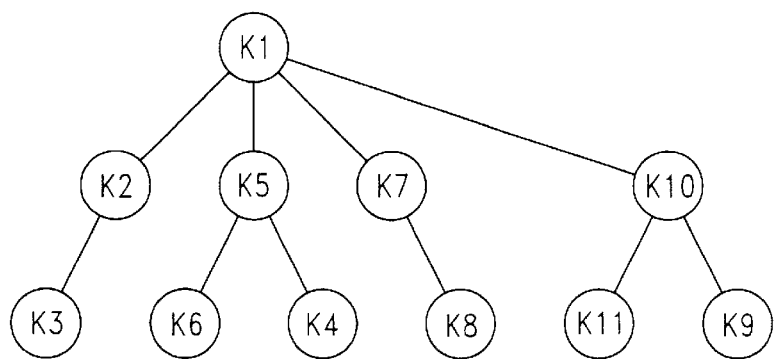
FIGS. 10 and 11 show relationship graphs between the bends present in the geometrical design of the panel of FIG. 8, obtained during a stage of the process according to the invention.
Figure 11:
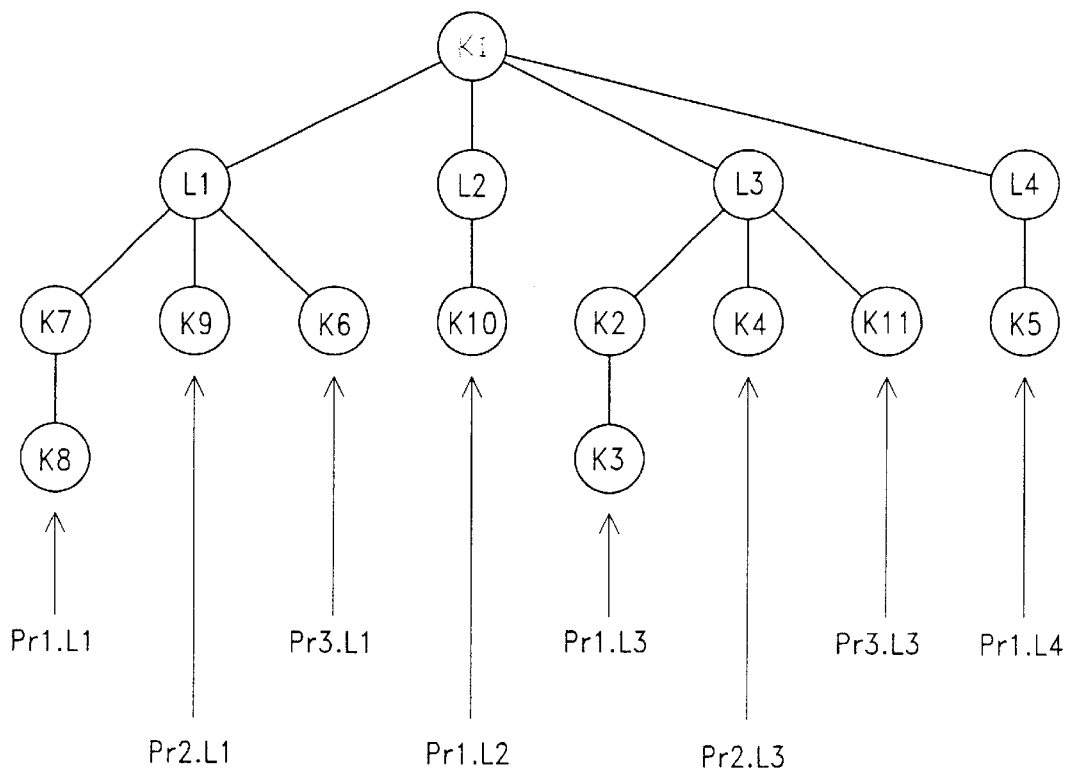

With reference to FIGS. 8–11, in FIG. 8 an example of paned designed by means of the tridimensional CAD program is shown. In FIG. 9, instead, a plan development of the panel of FIG. 8 is shown, for clarity purpose. During the stage of acquisition, the base K1 of the panel is determined and its sides L1, L2, L3, L4 are individuated. Then, the various bends K2–K11 and the geometrical parental relationships between bends to obtain a geometrical parenthood graph shown in FIG. 10 are individuated. Starting from the geometrical parenthood graph of FIG. 10, the bends are grouped into sets of bends parallel to one same side L1–L4 of the panel in order to obtain a logic parenthood graph shown in FIG. 11, from which the bending profiles Pr1.L1, Pr2.L1, Pr3.L1 relative to side L1; the bending profile Pr1.L2 relative to side L2; the bending profiles Pr1.L3, Pr2.L3, Pr3.L3 relative to side L3; and the bending profile Pr1.L4 relative to side L4 are defined.

Figure 13:
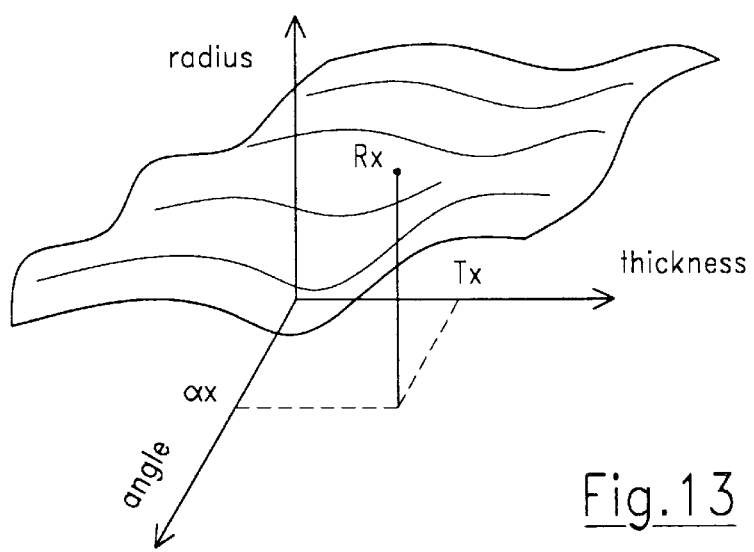
FIG. 13 shows schematically the use of the database of FIG. 6 by the process according to the invention.

In the design of the panel made in the CAD environment, for each bend, the user can explicitly or implicitly specify the type of bend by the indication of the bending radius. The motor of the database of materials, thicknesses and typology of the bends 2 is able both to decode directly the type of bend from the design acquired from the CAD design environment, as well as to determine the type of bend starting from the bending radius specified by the user in the design of the panel. Since the type of bend presupposes a determined series of bending operations (movements of the organs of the bending machine), no interpolation between data referring to different types of bends is possible, even if the final bends are similar. With reference to FIG. 13, once the type of material and the type of bend have been established, the database 2 obtains for each pair of values (thickness of the metal sheet, bending angle) of the table shown in FIG. 6 a function of the type shown in FIG. 13, and therefore for a pair of requested values ($\alpha x$, Tx) it is able to calculate the correct value of the parameter (in the example shown, bending radius Rx). It must be specified that although the two dimensions of the table shown in FIG. 6 (thickness, bending angle) potentially vary with continuity, the very nature of a table representation imposes that such indexes assume discrete values. During the stage of acquisition of the design, the elements of the matrix of FIG. 6 are therefore interpoled so as to determine the values of bending radius, stretching of the material during bending, correct positioning of the organs of the bending machine for any pair (thickness, bending angle), in order to obtain the continuous surface shown in FIG. 13. Such interpolation is carried out not only by taking into consideration the elements of the table with value immediately preceding or following the one to be interpoled, as it would happen in a linear interpolation, but by taking into consideration all the elements of the table, by determining their interpolation fourth degree, so as to minimise the error induced by a single not exact element input into the database.

If in the design of the panel the user has implicitly defined the type of a bend, by specifying its radius, then during the stage of acquisition of the design the process will automatically determine the type of bend, that is how to execute the bend. To this purpose a search is made in the database of materials, thicknesses and typology of the bends 2, by verifying which is the obtainable radius for each type of bend contained in it, and therefore by choosing the bend whose radius is the closest to the one specified by the user.

In the next stage of preliminary verification, the consistency of the geometrical design of the panel realised in the CAD environment is verified, by individuating and signalising possible interferences between the bends of the panel due to a erroneous tridimensional design of the panel itself. In particular, the correct definition of the shorn comers of the design of the panel is verified; an erroneous definition of the shorn comers would entail the interpenetrating of the material after bending of two adjacent sides. Possible errors in the geometrical design of the panel are signalised to the user, who has the possibility to go back to the CAD design environment in order to carry out the necessary corrections. Once the design has been modified, the process goes back to the stage of acquisition of the panel design, and therefore the design undergoes again the preliminary verification in order to determine its consistency. However, the user can also decide to disregard the possible errors detected during the preliminary verification stage, in assuming their subsequent correction, during the manufacture of the panel; this responds to the need to take into account the differences between the actual bendings of the metal sheet during manufacturing, bendings that are intrinsically approximate, and the simulation of the bendings in the CAD design environment, that is exact by its own nature.

Still during the preliminary verification, the need to utilise possible optional tools of the bending machine, if recognised as being available in the previously described configuration stage, is verified. If such optional tools have been recognised as available in the configuration stage, their need to the obtainment of the panel is signalised to the user, and at the same time the corrections to be made to the design created in the CAD environment that allow the production of the panel with the selected bending machine even without the optional tools is signalised.

In addition, during the preliminary verification stage the possible relationships of time priority between the various profiles of the panels are verified; such relationships occur when the bending of one of the profiles also causes the deformation of the metal sheet corresponding to the development of another profile, if this has not previously been bent.

Once completed the preliminary verification stage, in the subsequent processing stage, the sequence of operations that the chosen bending machine must execute in order to obtain the single bendings specified in the geometrical design of the panel that has been predisposed in the CAD environment, which has been acquired in the stage of acquisition of the design and submitted to verification in the preliminary verification stage, is determined. Each profile of the panel that has been individuated in the previous stage of acquisition of the design is considered individually and, for each bend of each profile, it is verified if such bend is obtainable by means of an operation of elementary bending (that is, whose parameters depend only on the geometrical parameters of the bend acquired during the stage of acquisition of the design) or if that bend has to be obtained in conjunction with one or more adjacent bends by means of particular movements of the organs of the bending machine (the so-called special cycles of bending mentioned above). More specifically, in the processing stage the process is capable to recognise possible special bending profiles, that are not obtainable as a simple combination of elementary bendings, even within the profiles individuated during the stage of acquisition of the panel design; in this case, the special profile will be preceded and/or followed by elementary bendings.

Once the sequence of the operations that the bending machine must execute in order to obtain each side of the panel has been individuated, such sequence of operations is simulated tridimensionally, with the aid of the tridimensional CAD design environment, in such a way that the user can verify the correctness of the choices being made previously to the generation of the sequence of instructions for the bending machine. For the simulation the process takes advantage of the information input in the processing environment during the configuration stage, in particular of the virtual representation in scale 1:1 of the bending machine (FIG. 3) obtained in the configuration stage by associating the representations of the geometrical shapes of the organs of the bending machine that are contained in the database 1 with the values contained in the configuration files of the selected bending machine, and the library of routines shared with the bending machine processing program, which allow to simulate the movement of the mechanical organs of the bending machine.

Should the tridimensional simulation of the sequence of operations that the bending machine must execute in order to obtain the panel evidence interferences between the profile that is being bent and an organ of the bending machine, the process according to the invention automatically determines an alternative mode to the obtainment of such profile. If such alternative mode cannot be individuated, the user is informed (both graphically and with a proper message on the processor display) of the fact that the geometrical characteristics of the panel make it not manufacturable with the bending machine selected in the configuration stage. If instead an interference between different profiles of the panel is individuated, such interference is automatically removed by modifying the sequence of operations, in order to realise the different profiles through a different sequence.

At the end of the processing stage, the process according to the invention has determined both the sequence of controls that must be conveyed to the bending machine in order to obtain the various profiles of the panel, and the sequence by which such profile are to be realised.

During the stage of modification of the panel design, the plan development of the panel, that is the dimensions of the metal sheet necessary to the obtainment of the desired panel and the shorn corners necessary to the obtainment of the profiles, is determined automatically in the tridimensional CAD design environment, on the bases of the sequences of bending operations determined in the processing stage. The plan development thus obtained can be used, in a CAM (Computer Aided Manufacturing) environment for a punching machine, in order to generate automatically a sequence of controls ("Program for the punching machine" in FIG. 1) for a punching machine that will provide for the punching of the metal sheet.

In addition, the plan development thus determined is memorised together with the data of the panel design (solid object reproducing the panel). In this way, each subsequent access to the design of the panel will automatically make it possible to have access to the information obtained during the processing stage.

During the stage of modification of the panel design, the procedure according to the invention still allows the user to correct the panel design (in the CAD design environment) in order to prevent possible errors that have been evidenced in the previous stages of the process.

Then, the stage of the writing of the bending machine program follows, during which the sequence of controls for the bending machine is automatically generated. This stage consists in the translation of the sequence of operations that are determined in the processing stage into a sequences of controls (instructions) in the particular syntax of the programming language of the selected bending machine. At the end of this stage, the result is a sequences of controls ("program for the bending machine") written in the programming language of the selected bending machine which reproduces the sequence of operations determined in the processing stage. All the movements necessary to the obtainment of the panel, as determined in the processing stage, are translated into alphanumeric instructions. The program for the bending machine constitutes the entry of the processing program of the bending machine that, by acceding to the library of routines and to the configuration file of the bending machine, provides to generate a sequence of instructions that can be executed by the bending machine.

The process according to the invention also provides for a "feed-back" from field, in order to obtain information on the real characteristics of the panel that is manufactured by the selected bending machine on the bases of the program for the bending machine generated automatically, for the updating and enrichment of the database of materials, thicknesses and typology of the bends 2. Such information depends on the material being used, on its thickness, on the required type of bend, on the required bending angle, on the required bending radius. As mentioned, the database 2 can be initially built up on the bases of the results of experimental tests run on various bending machine by using a specimen material, as for example $FePO_2$, varying the other variable factors in a discrete way. The database can constitute a knowledge base and therefore it can be provided with a motor capable of interpoling experimental data in order to offer reliable results even for bends that are not directly proven experimentally. The feed-back of the actual manufacturing of the panel allows to enrich the database with experimental information obtained for other types of materials, so that the program for the bending machine generated automatically by means of the process according to the invention can be correct. The correction factors allow to compensate the errors due to the aforementioned interpolation, and the deviation of the behaviour of the material being used as regards the one used as a specimen, in terms of stretching undergone during the process of bending and/or spring-back in the presence of a determined bending action. The enrichment of the database allows to introduce the corrections necessary to obtain an actual panel as close as possible to the one designed in the CAD environment, in any subsequent processing for a panel with bends having similar characteristics.

What is claimed is:

1. A process for the automatic generation of a sequence of controls for a metal sheets bending machine, comprising the steps of:

providing for a first plurality of configuration files of a respective plurality of bending machines, each file containing information on the configuration of the respective bending machine;

providing for a second plurality of files each referring to a respective bending machine and constituting a library of controls for the bending machine;

providing for a first database of geometrical shapes of mechanical organs, containing a geometrical representation of mechanical organs of the bending machines;

providing for a second database containing information on the behavior of a plurality of materials when these are submitted to bending, said process comprising the following stages;

a geometrical design stage of a panel in a tridimensional CAD designing environment in which a geometrical design of a panel is defined;

a configuration stage for the selection of a particular bending machine within said plurality of bending machines, in such a way as to select a first file among said first plurality of files, and a second file among said second plurality of files;

a stage of acquisition of the geometrical design of the panel for the individuation of the bends provided in said geometrical design of the panel;

a stage of preliminary verification of the geometrical design of the panel for the verification of the manufacturability of the panel by means of the selected bending machine;

a processing stage in which, by associating the first file with the first database, a virtual tridimensional representation of the selected bending machine is obtained and said virtual representation of the bending machine is associated with said second file and with said second database, in order to obtain a tridimensional simulation of the bending process of a metal sheet, said simulation determining the sequence of bending operations that the bending machine must execute to obtain the designed panel;

a stage of generation of the sequence of controls for the bending machine starting from the sequence of the bending operations, said sequence of controls allowing the bending machine to execute said sequence of bending operations;

wherein each configuration file of a bending machine comprises a first section containing identification data of the type of bending machine, and a plurality of second sections, each associated to a respective mechanical organ of the bending machine, in which the information of the dimensions, the mutual position and the possibility of movement of the mechanical organ are memorized;

wherein said plurality of second sections comprises second sections associated with the optional mechanical organs of the bending machine that can be installed on the bending machine as an alternative to each other, said second sections containing information on the effective installation of the relative mechanical organ of the bending machine;

wherein said preliminary verification stage involves an interaction with said first file for the verification of the manufacturability of the designed panel by means of the selected bending machine with the mechanical organs actually being installed, and in case such verification of the manufacturability gives negative results, a verification of the manufacturability of the panel by substituting one or more mechanical organs of the bending machine with optional mechanical organs specified in said first file;

wherein said preliminary verification stage involves an interaction with the tridimensional CAD design environment in order to correct the geometrical design of the panel in case the verification of the manufacturability of the panel gives negative result; and wherein said second database comprises a plurality of sections each one referring to a particular material, each section of the second database comprising a plurality of subsections each one referring to a particular elementary bend and comprising numerical information on the stretching of the metal sheet during the bending process, on the obtainable bending radius and on the positioning of the organs of the bending machine in order to obtain such elementary bend.

2. The process according to claim 1, wherein each one of said second section is subdivided into a plurality of subsections, said plurality of subsection containing a first subsection containing numerical data indicative of the dimensions of the organ, a second subsection containing numerical data of the limits of the organ movement, a third subsection containing numerical data indicative of the rules of the organ movement and a fourth subsection containing numerical data indicative of characteristic values of the organ movement, as a value of the pressure that must be applied to an actuator of the organ.

3. The process according to claim 2, wherein said numerical data indicative of the rules of the organ movement consist in coefficients of equations of motions for the organ.

4. The process according to claim 2, wherein said plurality of second sections comprises at least one second section comprising a fifth subsection containing numerical data indicative of the position of the organ as regards the other organs of the bending machine.

5. The process according to claim 1, wherein each one of said subsections of the second database is structured in the form of a table containing, for pairs of discrete values (thickness of the material, bending angle), said numerical information on the stretching of the material, obtainable bending radius and positioning of the organs of the bending machine.

6. The process according to claim 5, wherein said plurality of sections of the second database comprises a section referring to special bending profiles obtainable as a combination of elementary bends and of other bending operations that are not referable to elementary bends.

7. The process according to claim 6, wherein said section referring to special bending profiles contains a parametrical definition of said special bending profiles.

8. The process according to claim 7, wherein said stage of acquisition of the geometrical design of the panel involves:
   the identification of the base of the panel that during the bending operations does not undergo roto-translations in space;
   the individuation of sides of the base of the panel;
   the individuation of topographical relationships among the bends contained in the panel geometrical design;
   the generation of a graph of parental relationships among the bends contained in the panel geometrical design;
   the individuation of bending profiles, each one consisting of a set of bends parallel to a respective side of the base of the panel.

9. The process according to claim 8, wherein said processing stage provides for the recognition of the special bending profiles even within said bending profiles that are individuated in the stage of acquisition of the panel geometrical design.

10. The process according to claim 9, wherein said second database is associated to a motor that, during said processing stage, makes an interpolation in order to obtain numerical information on stretching of the material, obtainable bending radius and positioning of the organs of the bending machine for any pair of values (material thickness, bending angle), starting from the table of pairs of discrete values (material thickness, bending angle) relative to the type of material and to the type of elementary bend specified in the geometrical design of the panel.

11. The process according to claim 1, wherein it provides for a stage of generation of a plan development of the panel, after said processing stage.

12. The process according to claim 11, wherein it provides for a stage of generation of a sequence of controls for a punching machine for metal sheets, after said stage of the plan development of the panel.

13. The process according to claim 11, wherein it provides for the memorization of said sequence of controls for the bending machine and of said plan development of the panel in said geometrical design of the panel.

14. The process according to claim 1, wherein it provides for a stage for the acquisition of data on the characteristics of a panel manufactured by a bending machine operating on the bases of said sequence of controls, and for the updating of said second database with the acquired data.

* * * * *